US011993942B2

(12) United States Patent
Youssef

(10) Patent No.: US 11,993,942 B2
(45) Date of Patent: May 28, 2024

(54) SAFETY CABLE SYSTEM

(71) Applicant: Magdy Youssef, Sayreville, NJ (US)

(72) Inventor: Magdy Youssef, Sayreville, NJ (US)

(73) Assignee: MJ ENGINEERING & DESIGN, Sayreville, NJ (US)

( * ) Notice: Subject to any disclaimer, the term of this patent is extended or adjusted under 35 U.S.C. 154(b) by 0 days.

(21) Appl. No.: 17/377,211

(22) Filed: Jul. 15, 2021

(65) Prior Publication Data

US 2023/0020395 A1 Jan. 19, 2023

(51) Int. Cl.

*E04G 21/32* (2006.01)
*A62B 35/00* (2006.01)
*A62B 1/18* (2006.01)

(52) U.S. Cl.

CPC ...... *E04G 21/3295* (2013.01); *A62B 35/0056* (2013.01); *A62B 35/0068* (2013.01); *E04G 21/3219* (2013.01); *E04G 21/3266* (2013.01); *A62B 1/18* (2013.01)

(58) Field of Classification Search

CPC ............ E04G 21/3295; E04G 21/3219; E04G 21/3266; E04G 21/3261; E04G 21/3223; E04G 5/14; E04G 5/142; A62B 1/18; A62B 35/0056; A62B 35/0062

See application file for complete search history.

(56) References Cited

U.S. PATENT DOCUMENTS

| | | | | |
|---|---|---|---|---|
| 1,018,698 A * | 2/1912 | Dennis | E04G 21/3261 | 182/138 |
| 1,099,352 A * | 6/1914 | Foldi | E04G 21/3261 | 182/138 |
| 2,305,906 A * | 12/1942 | William | E04B 1/35 | 269/58 |
| 2,430,714 A * | 11/1947 | Geer | A62B 1/22 | 482/28 |

(Continued)

FOREIGN PATENT DOCUMENTS

| | | | | |
|---|---|---|---|---|
| CA | 3105917 A1 * | 7/2021 | B66F 11/00 |
| CN | 111005584 A * | 4/2020 | |

(Continued)

*Primary Examiner* — Colleen M Chavchavadze
(74) *Attorney, Agent, or Firm* — McCarter & English, LLP

(57) ABSTRACT

A safety cable system for installation during building construction is provided and includes a first track mounted to a first structural element of a building, a first plurality of anchors slidably engageable with the first track, a second track mounted to a second structural element of a building, a second plurality of anchors slidably engageable with the second track, and a plurality of cables interconnecting the first plurality of anchors and the second plurality of anchors. The first plurality of anchors, the second plurality of anchors, and the plurality of cables are positionable vertically at a plurality of different heights above a floor of the building, or horizontally at a plurality of different positions above the floor. Also provided are stops for restricting movement of the first and second plurality of anchors, roller (Continued)

bearings that capture the plurality of anchors in the tracks and allow the anchors to slide with respect to the tracks, plates and associated mounting hardware for mounting the tracks, turnbuckles for tensioning the cables, and tie points for tying a netting between the tie points.

4 Claims, 15 Drawing Sheets

(56) References Cited

U.S. PATENT DOCUMENTS

| | | | | | |
|---|---|---|---|---|---|
| 3,454,293 | A * | 7/1969 | Howlett | F16G 11/12 | 403/44 |
| 4,119,301 | A * | 10/1978 | Payne | E04H 17/139 | 256/41 |
| 4,129,197 | A * | 12/1978 | Preston | E04G 21/3266 | 182/138 |
| 4,732,234 | A * | 3/1988 | Brickman | E04G 21/3266 | 182/138 |
| 4,838,382 | A * | 6/1989 | Nusbaum | E04G 21/3261 | 182/138 |
| 4,856,615 | A * | 8/1989 | Nusbaum | E04G 21/3261 | 182/138 |
| 5,118,056 | A * | 6/1992 | Jeanise | E01F 13/048 | 246/111 |
| 5,170,829 | A * | 12/1992 | Duncan | B65G 1/02 | 160/84.02 |
| 5,593,368 | A * | 1/1997 | Checketts | A63B 21/4009 | 482/130 |
| 6,585,122 | B2 * | 7/2003 | Calleja | A47F 5/01 | 211/183 |
| 6,722,512 | B2 * | 4/2004 | Scully | A47F 5/13 | 211/183 |
| 6,845,589 | B1 * | 1/2005 | Thompson | E05B 65/0007 | 49/34 |
| 6,938,785 | B2 * | 9/2005 | Denny | A47F 13/00 | 211/183 |
| 7,140,802 | B2 * | 11/2006 | Lamore | E01F 13/12 | 404/6 |
| 7,618,223 | B1 * | 11/2009 | Begley | A61G 7/1059 | 414/921 |
| 10,030,397 | B2 * | 7/2018 | Stearns | E04G 21/3204 | |
| 10,842,270 | B2 * | 11/2020 | Clarke | B65G 1/02 | |
| 10,883,286 | B2 * | 1/2021 | Long | E04G 21/3266 | |
| 11,235,959 | B2 * | 2/2022 | Mayfield | E04H 12/345 | |
| 2004/0135134 | A1 * | 7/2004 | Rice | E04G 21/3223 | 256/32 |
| 2004/0211740 | A1 * | 10/2004 | Denny | B65G 1/02 | 211/183 |
| 2005/0017115 | A1 * | 1/2005 | de Lorenzo | E01F 13/028 | 242/378.4 |
| 2007/0167068 | A1 * | 7/2007 | Floyd | A01K 15/025 | 439/497 |
| 2008/0173854 | A1 * | 7/2008 | Meaux | E01F 13/02 | 256/23 |
| 2008/0272675 | A1 * | 11/2008 | Denny | A47B 96/00 | 312/352 |
| 2009/0159369 | A1 * | 6/2009 | McCarthy | E04G 21/3266 | 182/222 |
| 2012/0119907 | A1 * | 5/2012 | Teuchert | G08B 5/006 | 340/541 |
| 2014/0090314 | A1 * | 4/2014 | Pedraza | E02D 5/803 | 52/741.15 |
| 2015/0184405 | A1 * | 7/2015 | Stearns | A62B 1/22 | 182/139 |
| 2020/0232236 | A1 * | 7/2020 | Long | E04G 21/24 | |
| 2021/0222445 | A1 * | 7/2021 | Walraven | E04G 21/242 | |
| 2021/0230891 | A1 * | 7/2021 | Long | E04G 21/24 | |

FOREIGN PATENT DOCUMENTS

| | | | | | |
|---|---|---|---|---|---|
| CN | 112832376 | A | * | 5/2021 | E04B 1/2403 |
| CN | 112832377 | A | * | 5/2021 | E04B 1/2403 |
| DE | 202015101655 | U1 | * | 5/2015 | B66C 7/04 |
| EP | 1160395 | A2 | * | 12/2001 | E04G 21/3219 |
| GB | 2421522 | A | * | 6/2006 | A01G 13/0206 |
| GB | 2582616 | A | * | 9/2020 | E04G 21/32 |

* cited by examiner

SAFETY CABLE SYSTEM

BACKGROUND

Field of the Invention

The present disclosure relates to safety systems. More specifically, the present disclosure relates to a safety cable system for use in securing various sites, such as construction sites.

Related Art

In the construction industry, safety of workers is a paramount concern. This concern is of particular importance in construction involving tall structures, as falls from such structures can result in death or serious injury.

Various devices have, in the past, been provide to protect against objects from falling off of construction sites. For example, perimeter protection systems and safety netting systems of various designs provide an outer covering for a building in which the outer walls are non-structural and are utilized only to keep the weather out and the occupants in. For example, in applications where curtain walls are being installed on a building, a vertical netting is first placed about the perimeter of the building. Construction workers then install tie-off points on the structure of building, to which the workers are secured for their safety. Then, the netting is tied to the tie-off points. The workers may remove the netting and expose, for example, the edge of the building when necessary.

Additionally, various cable systems have been developed for protecting workers. The cables of such systems are often noncorrosive wire cables that are located at specific heights. For example, some regulations require that the cables can be located at heights of 60 inches (1,524 mm), 42 inches (1,067 mm), 21 inches (533 mm), and 0 inches (0 mm) above the level of the floor or, when installed at the roof level, the roof. However, the cables of such systems are fixedly attached in position.

Various drawbacks exist with the foregoing safety systems. For example, during the construction process, it is sometimes necessary to temporarily remove or lift the aforementioned protection systems in order to provide access into a construction site (e.g., to deliver materials) or to perform construction tasks on both sides of the protection system. In the case of cable protection systems, it is often necessary to move or remove all but one of the cables (e.g., the cable at the height of 60 inches). This can be cumbersome and require the physical removal of the cables, and can also present a major safety hazard.

Accordingly, what would be desirable is a safety cable system which solves the foregoing and other needs.

SUMMARY

The present disclosure relates to a safety cable system for installation during building construction. The system includes a first track mounted to a first structural element of a building, a first plurality of anchors slidably engageable with the first track, a second track mounted to a second structural element of a building, a second plurality of anchors slidably engageable with the second track, and a plurality of cables interconnecting the first plurality of anchors and the second plurality of anchors. The first plurality of anchors, the second plurality of anchors, and the plurality of cables are positionable vertically at a plurality of different heights above a floor of the building, or horizontally at a plurality of different positions above the floor. Stops could be provided in the tracks for restricting movement of the first and second plurality of anchors. Each of the plurality of anchors could include roller bearings that capture the plurality of anchors in the tracks and allow the anchors to slide with respect to the tracks. The tracks could be mounted to the structural elements via plates and associated mounting hardware, and the plurality of cables could each be tensioned by a plurality of turnbuckles. A plurality of tie points could be provided for tying a netting between the tie points, and the cables could support the netting.

In another embodiment, the present disclosure relates to a safety cable system having a transportable frame comprising a plurality of vertical members and a plurality of horizontal members interconnecting the plurality of vertical members, and a plurality of movable cable assemblies attached to the transportable frame, each of the plurality of movable cable assemblies movable with respect to the frame. The frame could include wheels for allowing easy transportation and positioning of the frame, and the frame could be positioned about a structural element of a building, such as a column.

BRIEF DESCRIPTION OF THE DRAWINGS

The foregoing features of the invention will be apparent from the following Detailed Description, taken in connection with the accompanying drawings, in which.

DETAILED DESCRIPTION

The present disclosure relates to a safety cable system, described in detail below in connection with FIGS. 1-15.

Figure 1:
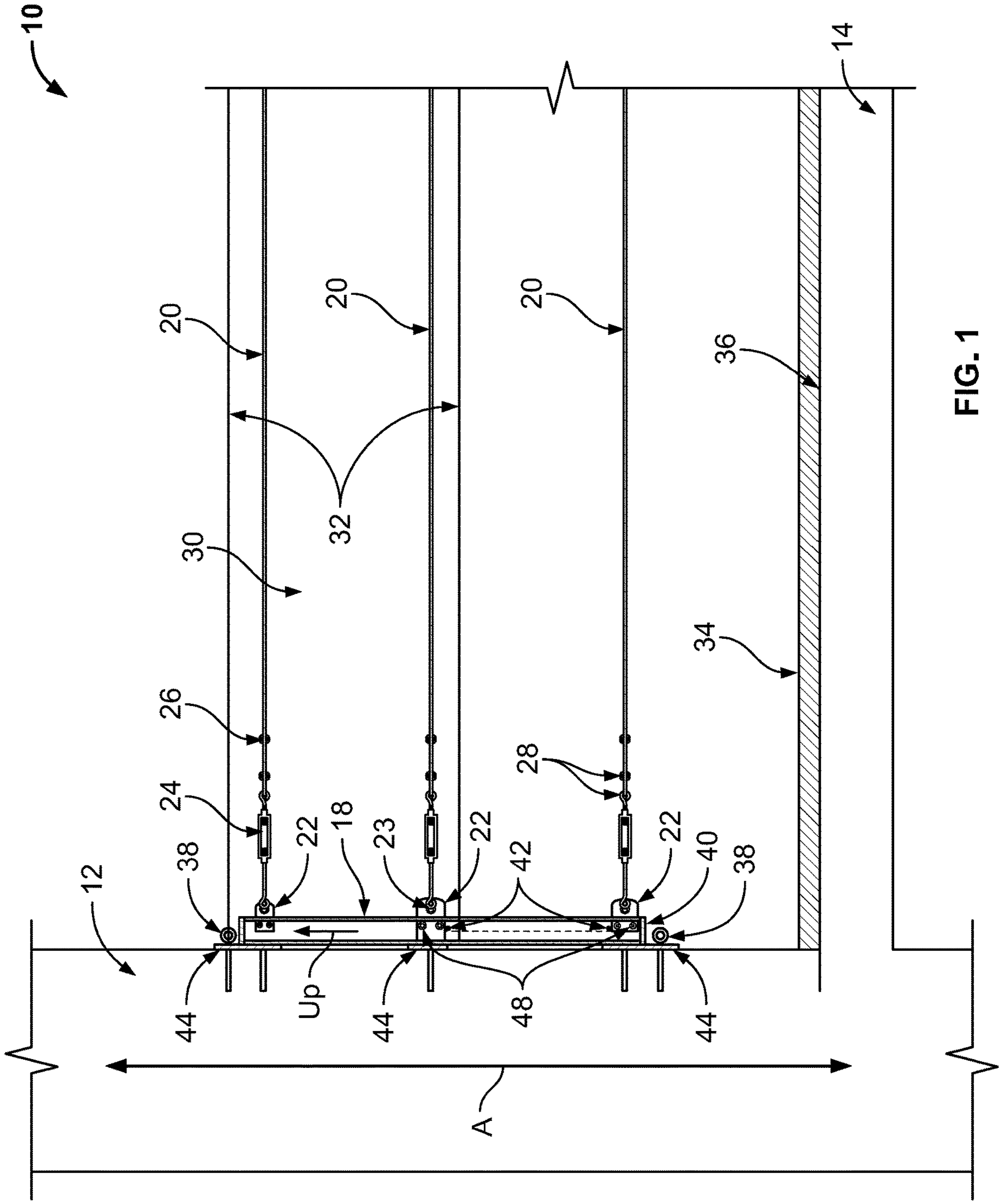
FIG. 1 is a side view of the safety cable system of the present disclosure.

FIG. 1 is a side view of the safety cable system of the present disclosure, indicated generally at 10. The system 10 is configured for attachment between two support columns of a building under construction, such as a support column 12 and an opposite column (not shown in FIG. 1). The system 10 includes column attachment track 18 that is fixedly attachable to the support column 12, an opposite column attachment channel (not shown in FIG. 1), and a plurality of cables 20 that are slidably attached to the channel 18 and its opposite channel. Advantageously, the cables 20 can slide up and down vertically as indicated by arrow A, allowing the cable to be positioned at any desired vertical location along the track 18. Conveniently, this allows the cables 20 to be positioned at desired locations to accommodate buildings of various configurations while also providing safety for workers. Also, the cables 20 can be temporarily moved to allow entry into the building (e.g., of personnel or equipment, such as curtain walls, HVAC equipment, etc.) and quickly restored to their original locations in order to maximize safety, without requiring works to pull on the cables or use tools to adjust the cables.

The ends of the cables 20 are attached to the channel 18 (and its opposite channel) by sliding anchors 22 which are captured within the channel 18 and which can slide vertically with the track 18. One end of each anchor 22 includes pairs of roller bearings 48 which are captured within the track 18 and permit the anchor 22 to slide within the track 18, and an opposite end of each anchor 22 protrudes through a slot in the track 18 and includes an aperture 23 for receiving a respective cable 20 so that each cable 20 is fixedly attached to a respective anchor 22. Each end of the cable includes a turnbuckle 24 which can be turned to tension and untension the cable as desired. For example, when one of the turnbuckles 24 is untensioned, a respective cable 20 can be moved vertically with respect to the track 18. When the cable 20 (and its anchors 22) are positioned at desired locations on the track 18, the turnbuckle 24 can then be tightened, causing the cable 20 to be tensioned. In addition to tensioning the cable 20, the force exerted by the turnbuckles 24 cause the cable to remain in a fixed position (e.g., the tension causes the anchors 22 to bear against the track 18 so that the anchors 22 remain in a fixed position). Clamps 26, 28 (see FIG. 2) can also be provided for facilitating attachment of the cables 20 to the turnbuckles 24.

One or more of the cables 20 can be utilized to support a netting 30 (or tarp or other material), if desired. In such circumstances, upper and lower edges 32 of the netting 30 could be fixedly tied to one or more tie points 38, if desired and the netting 30 could rest against (and be supported by) the cables 20. Additionally, it is noted that the cables 20 could be positioned at desired heights above a slab 14, floor 34, or substrate 36 above which they are installed. For example, to meet code requirements, the cables 20 could be positioned at heights of 60 inches (1,524 mm), 42 inches (1,067 mm), 21 inches (533 mm), and 0 inches (0 mm). Of course, other heights are possible.

The track 18 can be fixedly mounted to the support column 12 in any desired fashion. For example, as shown in FIG. 1, a plurality of attachment plates 44 could be provided, which could be fixedly attached to the track 18 (e.g., by welding or formed integrally with the track 18). The plates 44 could be positioned flush against the column 12, and could include apertures for facilitating attachment of the plates 44 to the column 12 using fasteners, bolts, screws, clamps, etc. Preferably, such attachment is not permanent, as the system 10 is intended to be removed when construction of a building is complete.

Figure 2:
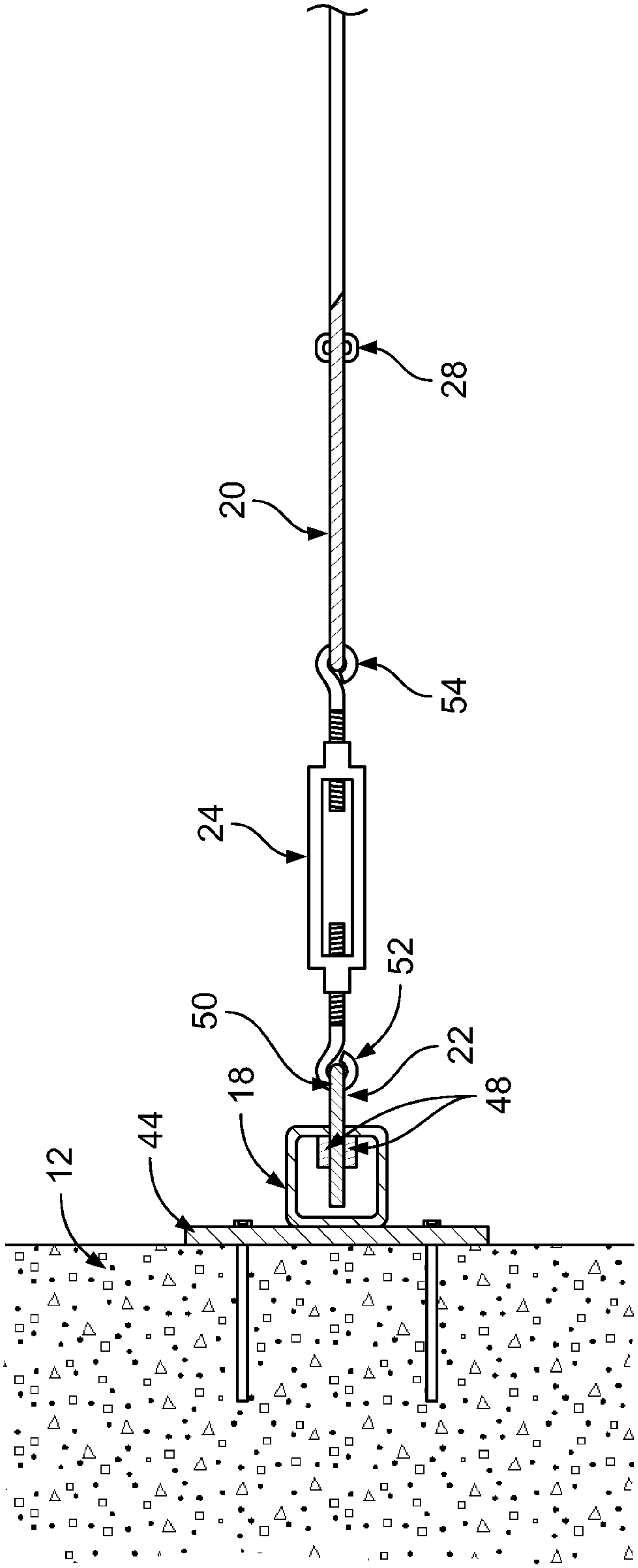
FIG. 2 is partial cross-sectional view of the safety cable system of FIG. 1, illustrating attachment of the system to a structural column of a building.

FIG. 2 is partial cross-sectional view of the safety cable system 10 of FIG. 1, illustrating attachment of the system 10 to the column 12. As can be seen, the plates 44 are attached to the column 12 using bolts, which facilitate fixed attachment of the plates 44 to the column 12 yet eventual removal of the bolts and the system 10 when construction is complete. It is also envisioned that the plates 14 could be attached to the column 12 without requiring the use of any fasteners. In such circumstances, removable clamps, straps, or bands could be used to affix the plates 44 to the column 12, wherein the clamps, straps, or bands are positioned snugly about the column 12 and attached at ends to the plates 44.

It is further noted that one or more stops 42 could be provided in the track 18 in order to limit travel of the anchors 22 with respect to the track 18. Such stops could be in the form of bolts or other protrusions that extend into the track 18 and physically block movement of the anchors 22 at desired locations. The stops 42 could be removable from the track 18 if desired, and a plurality of apertures could be provided in the track 18 so that the stops 42 can be inserted at desired locations along the track 18.

As can be seen in FIG. 2, the channel 18 includes a slot through which ends or tabs 50 of the anchors 22 protrude and receive eye hooks 52 of the turnbuckles 24. The cables 20 are attached to opposite eye hooks 54 of the turnbuckles 24. Specifically, ends of the cables 20 are threaded through the eye hooks 54, folded back onto the cables 20, and then clamps to the cables 20 by one or more of the clamps 26 (see FIG. 1) or 28 to facilitate fixed connections between the cables 20 and the turnbuckles 54.

Opposite ends of the anchors 22 are captured within the track 48 by pairs of roller bearings 48 which bear against inner surfaces of the track 18, are rotatably mounted to the anchors 22, and are captured by the track 18. The track 18 is mounted to the column 12 via the plate 44 and concrete anchors extending through apertures in the plate and into the column 12. Of course, as noted above, the track 18 could be attached to the column 12 by other means, such as removable bands, straps, chains, etc.

Figure 3:
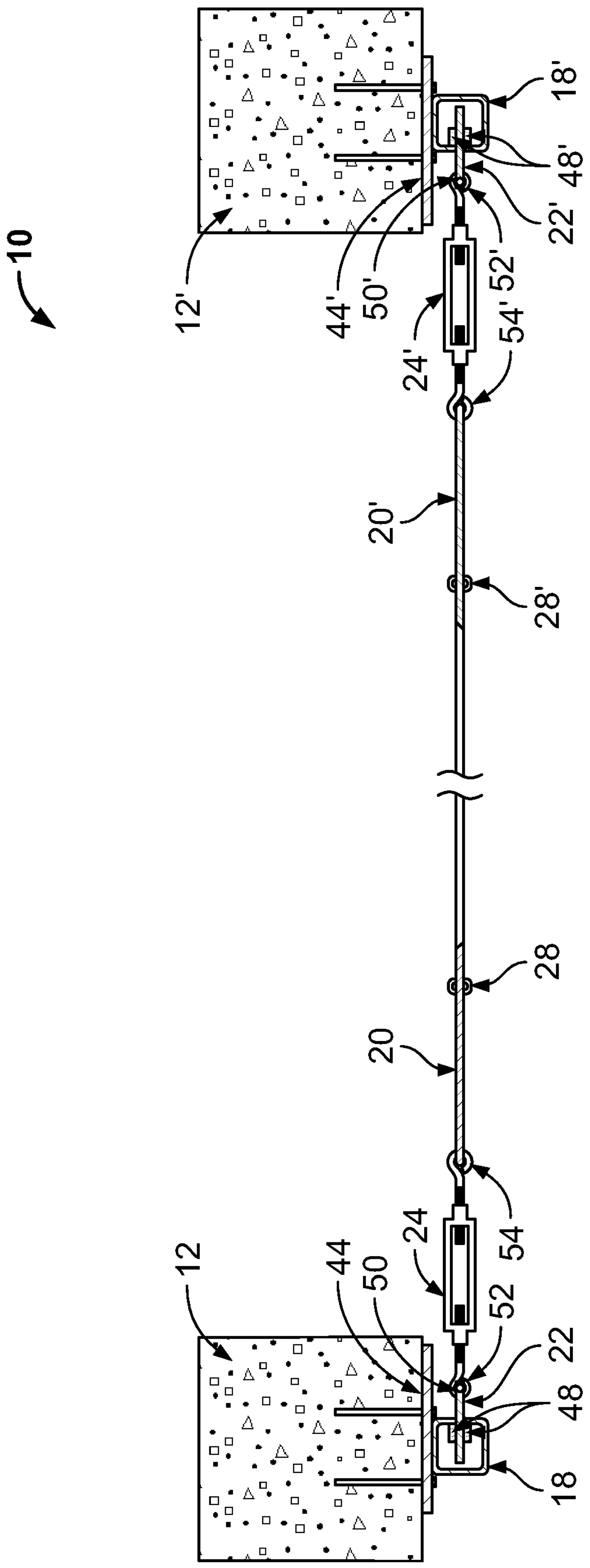
FIG. 3 is a partial cross-sectional view of the safety cable system of FIG. 1, illustrating attachment of the system between two columns of a building.

FIG. 3 is a partial cross-sectional view of the safety cable system 10 of FIG. 1, illustrating attachment of the system between two columns 12, 12' of a building. The components associated with the column 12' are identical in structure and function to the corresponding components discussed above in connection with the column 12 (and are similarly numbered), and include track 18', anchors 22', turnbuckles 24', clamps 28', plates 44', tabs 50', eye hooks 52' and 54', and other complementary components (not shown) that are identical in construction to corresponding components discussed above in connection with the column 12 (e.g., clamps 26', stops 40', ties 38', etc.). As with the track 18 discussed above, the track 18' can be identically mounted to the column 12' in the same fashion discussed above in connection with the column 12. Additionally, the anchors 22' function identically to the anchors 22, and can slide with respect to the track 18' in similar fashion.

Figure 4:
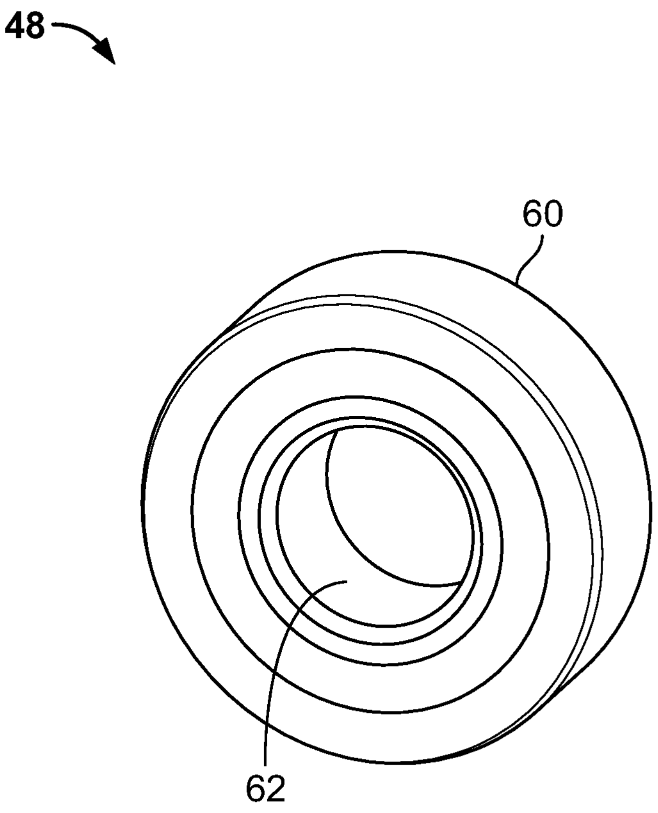
FIG. 4 is a perspective view illustrating a roller bearing of the safety cable system of the present disclosure, in greater detail.

FIG. 4 is a perspective view illustrating the roller bearings 48 (and '48) of the safety cable system of the present disclosure, in greater detail. The roller bearings 48 (and '48) include an outer bearing surface 60 which bears against inner surfaces of the track 18 (and 18') and an inner surface 62 which is mounted to a pin (not shown) formed integrally with (or attached to) the anchors 22, 22'. Captured within the surfaces 60, 62 are lubricated bearings which allow the surface 60 to rotate with respect to the surface 62. Any suitable roller bearing could be utilized in connection with the bearings 48, 48'.

It is noted that the safety cable system of FIGS. 1-4 is shown and described in connection with installation to concrete building columns. Of course, the system could also be installed in connection with other types of structural elements, such as steel building columns or other types of structural elements. Examples of attachment components for attaching the safety cable system to steel building columns will now be discussed in connection with FIGS. 5-6, it being understood that such attachment components could also be used in connection with embodiments discussed above in connection with FIGS. 1-4.

Figure 5:
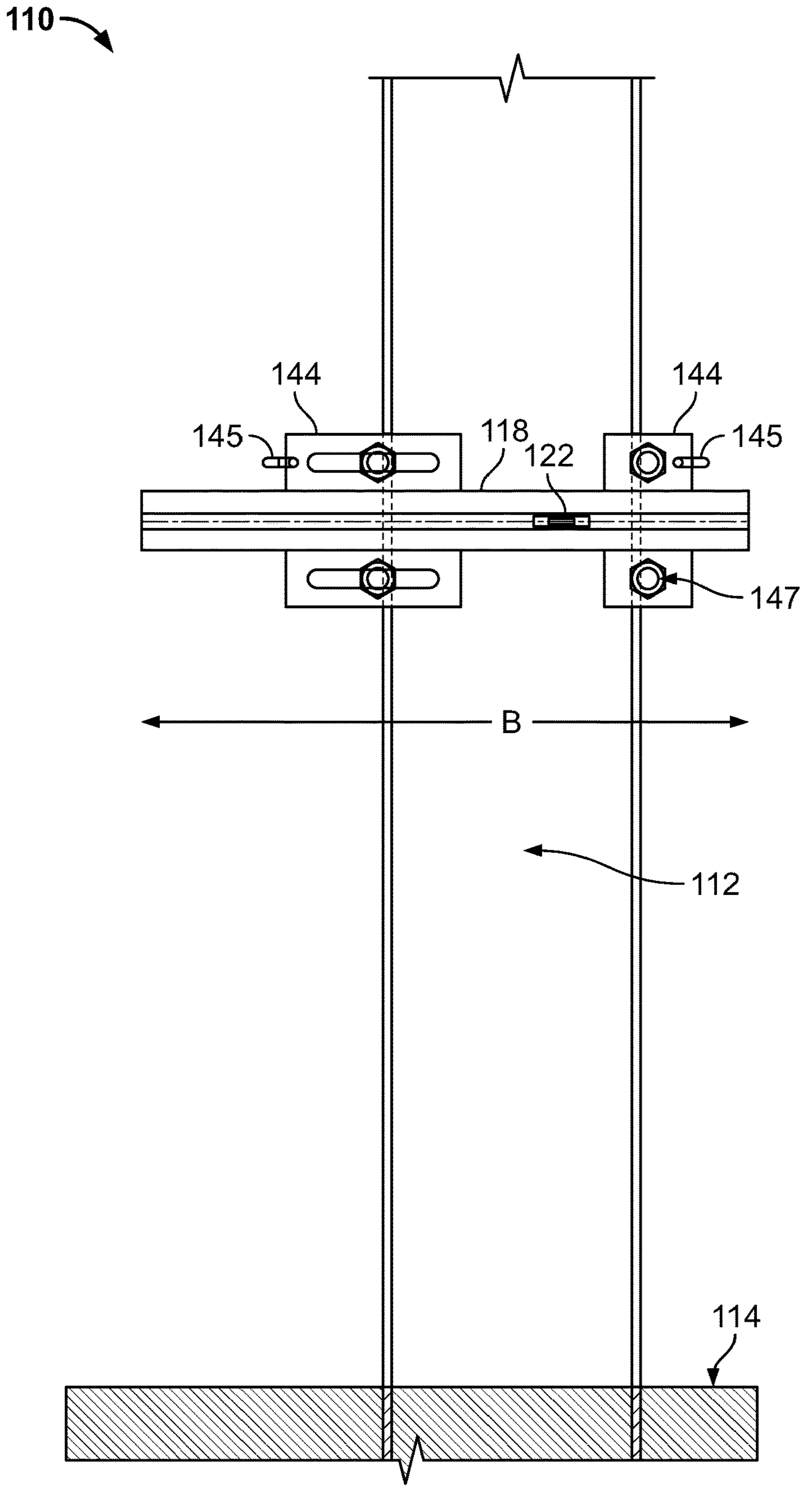
FIG. 5 is side view of another embodiment of the safety cable system of the present disclosure, wherein the safety cables are installed in a horizontal configuration.

FIG. 5 is side view of another embodiment of the safety cable system of the present disclosure, indicated generally at 110, wherein the safety cables (not shown) are installed in a horizontal configuration and can be moved horizontally in the general direction indicated by arrow B (such that the plurality of safety cables are positioned horizontally at a plurality of different positions above a floor). In this embodiment, a track 118 is mounted horizontally to a support column 112 (and a corresponding track is also provided on a second support column), and a plurality of anchors 122 are captured within and slide horizontally with respect to the track 118. The track 118 could be mounted to the column 112 by plates 144 and associated means 147 for mounting the plates to the column 112 (e.g., bolts, clamps, screws, straps, chains, etc.). By mounting the track 118 horizontally, cables attached to the anchors 112 can move horizontally, e.g., parallel to the slab 114. It is noted that the components forming the system 110 are identical in construction and function to the components discussed above in connection with the system 10. Tie-off points 145 are also provided (e.g., in the form of eye hooks mounted to and/or integrally formed with the plates 144), which can be utilized for tying one or more ropes, cables, or other components (e.g., during adjustment of the system 110).

Figure 6:
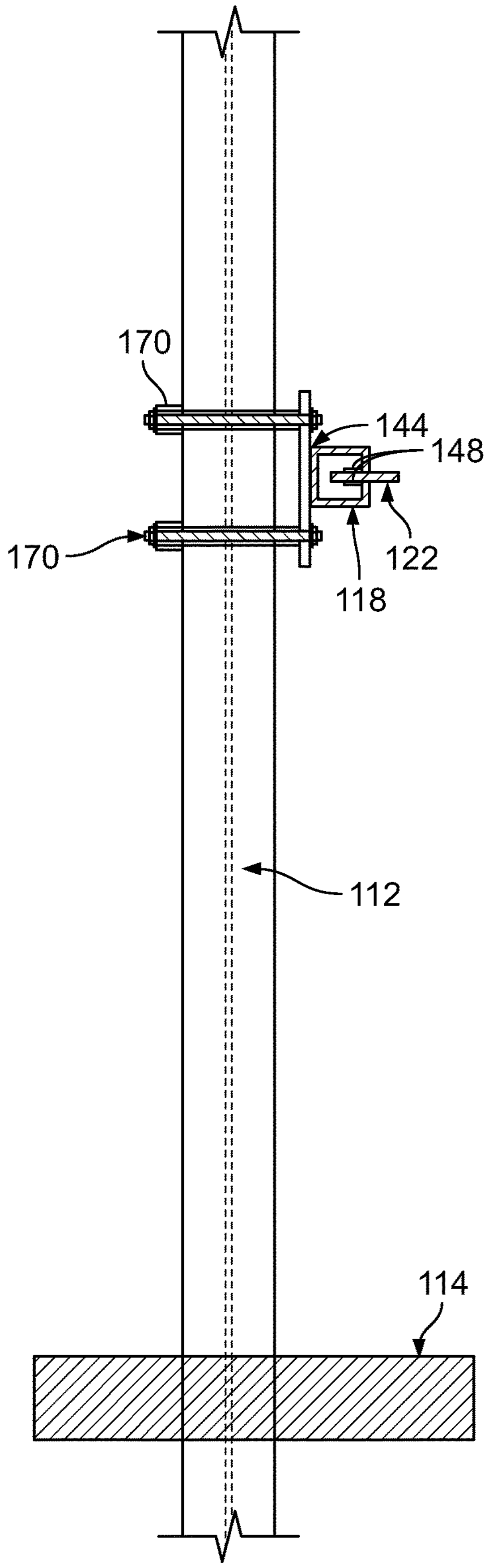
FIG. 6 is side view of the safety cable system of FIG. 5.

FIG. 6 is side view of the safety cable system of FIG. 5. As can be seen, the plates 144 are mounted against the column 112 by any suitable means, such as bolts and corresponding nuts 170 shown in FIG. 6. Of course, other attachment means are possible. Roller bearings 148 (identical to the roller bearings 48, 48' discussed above) are captured within and bear against inner surfaces of the track 118 and allow the anchors 122 to slide with respect to the track 118. The track 118 and cables attached thereto could be mounted at any suitable height above the slab 114, such as 5 feet as illustrated in FIG. 6.

While the embodiments discussed above in connection with FIGS. 5-6 describe attachment to steel building columns, it is to be understood that attachment to other types of building elements, such as concrete columns, is also possible. For example, the attachment components discussed above in connection with FIGS. 1-4 for attachment to concrete columns could also be utilized in connection with the embodiment of FIGS. 5-6.

Figure 7:
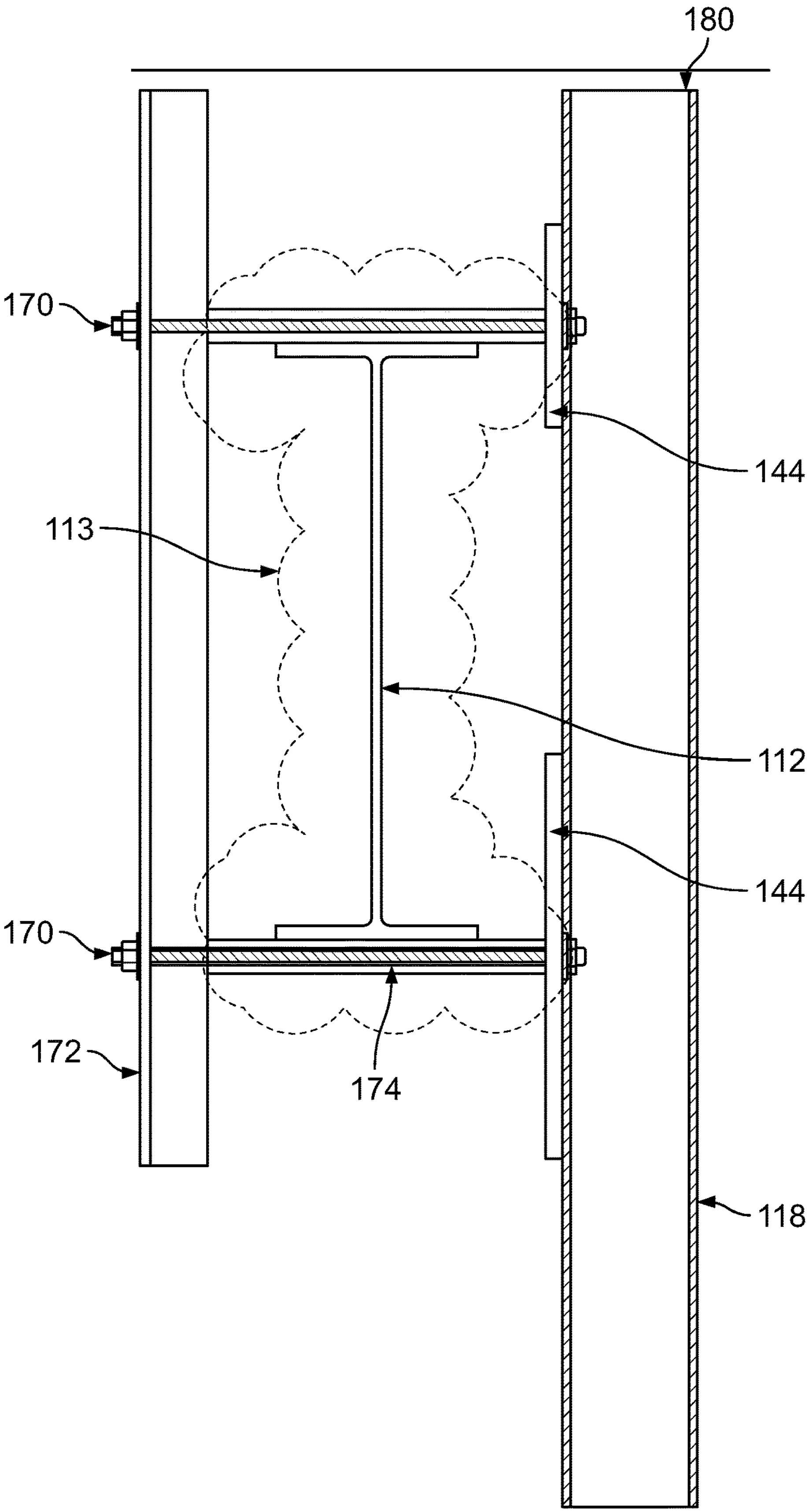
FIG. 7 is a top plan view of the safety cable system of FIG. 5.

FIG. 7 is a top plan view of the safety cable system of FIG. 5. As can be seen, the system is installed adjacent to a slab edge 180, and is affixed to a structural component such as the steel beam 112. The nuts 170 could be threadably engaged with threaded rods 174, and the threaded rods could extend through apertures in bracket 172 and corresponding apertures in the plates 144, such that the structural element 112 is “sandwiched” or “clamped” between the bracket 172 and the plates 144. Optionally, one or more components could be welded to the structural element 112, if desired, to provide additional rigidity. In cases where fireproofing 113 is provided on the structural element 112, the fireproofing 113 could be removed in areas near the plates 144, bracket 172, and rods 174, to ensure good contact between one or more of these components and the structural element 112. Further, the rods 174 could extend through corresponding tubes interconnecting the plates 144 and the bracket 172, if desired.

Figure 8:
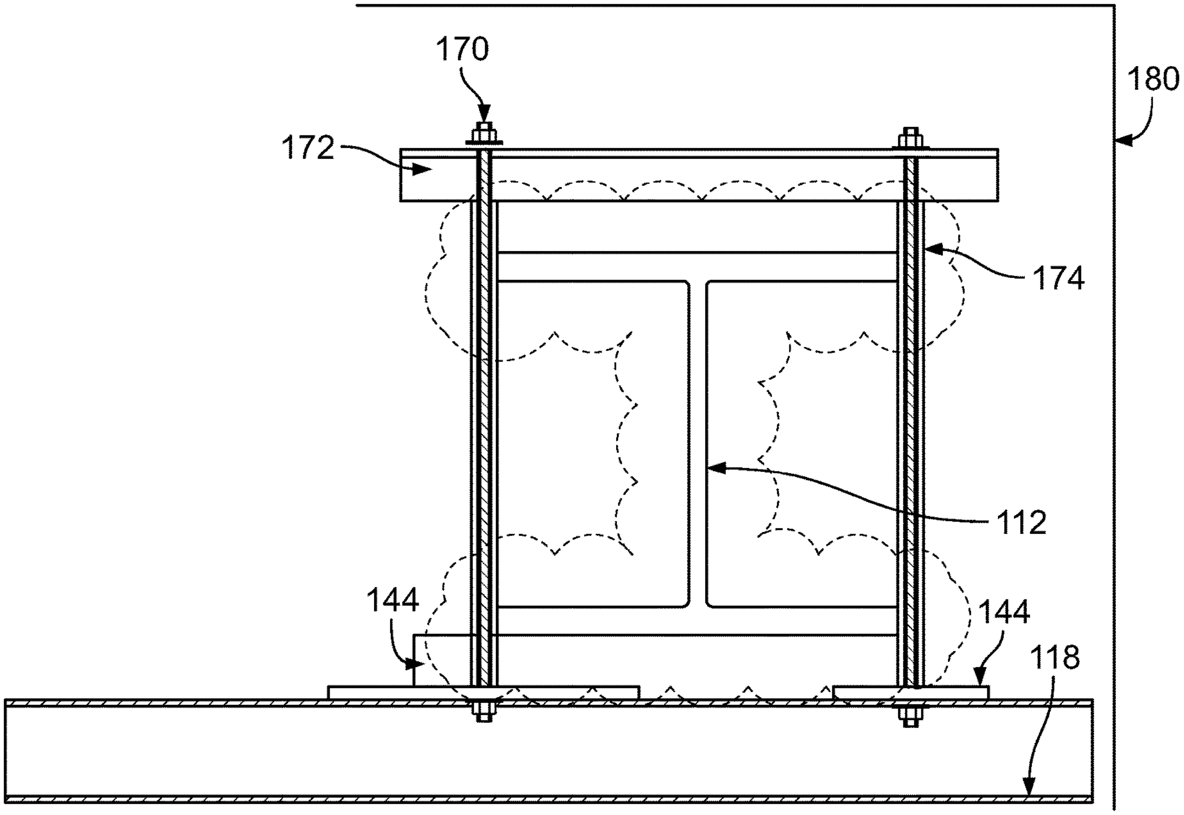
FIG. 8 is a top plan view of the safety cable system of FIG. 5, showing installation at a corner column of a structure.

FIG. 8 is a top plan view of the safety cable system of FIG. 5, showing installation at a corner column of a structure. As can be appreciated, the system can be installed in a wide variety of orientations and/or configurations, and provides protection for workers and materials not only along the sides of buildings, but also at corners of such buildings.

Figure 9:
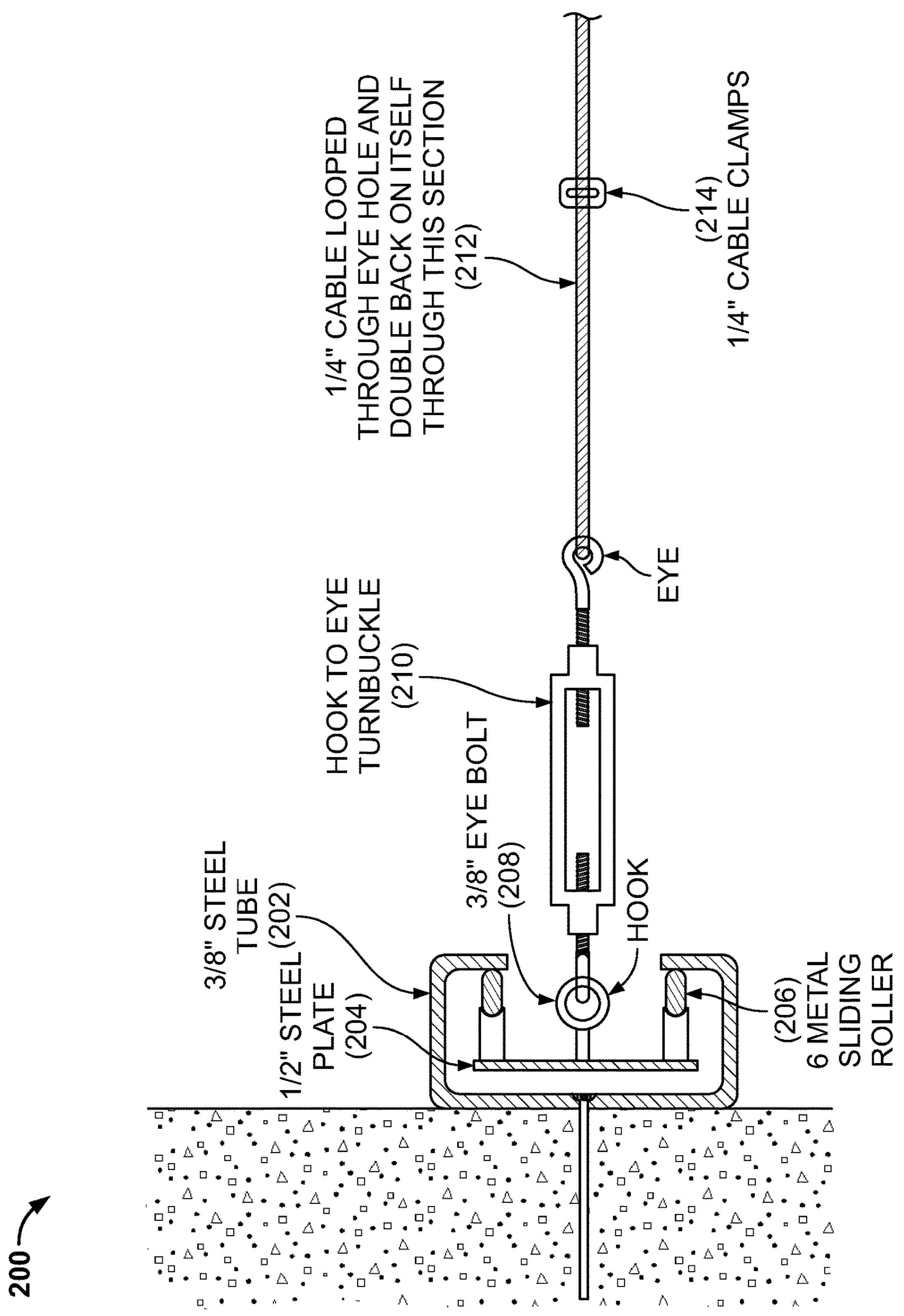
FIG. 9 is diagram illustrating another embodiment of the attachment track of the present disclosure.

FIG. 9 is diagram illustrating another embodiment of the attachment track of the present disclosure, indicated generally at 200. In this embodiment, the track 200 is formed from a steel tube 202, a steel plate 204 which translates within the tube 202, and a plurality of metal sliding rollers 206 which bear against inner surfaces of the tube 202 and allow the plate 204 to slide (translate) with respect to the tube 202. An eye bolt 208 allows for attachment of a turnbuckle 210, which itself is attached to a cable 212. The cable 212 could be clamped using one or more claims 214. The track 200 could be utilized with any of the embodiments of the present disclosure discussed herein.

Figure 10:
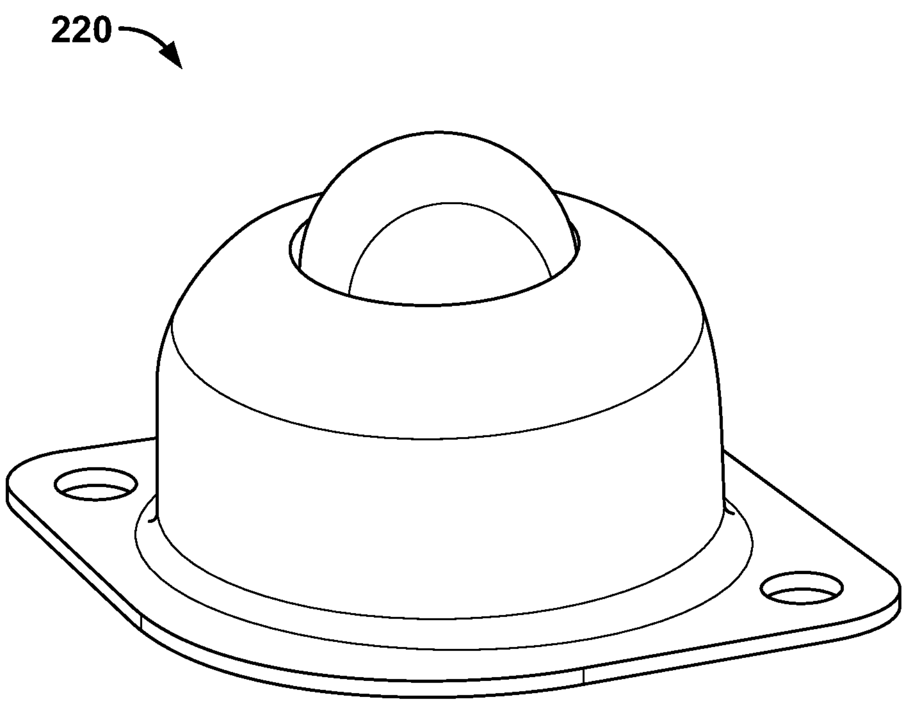
FIG. 10 illustrates a roller bearing capable of being utilized in connection with the embodiment of FIG. 9.

FIG. 10 illustrates a roller bearing 220 capable of being utilized in connection with the embodiment of FIG. 9. The bearing 220 could replace and/or supplement the metal sliding rollers 206 shown and described in connection with FIG. 9.

Figure 11:
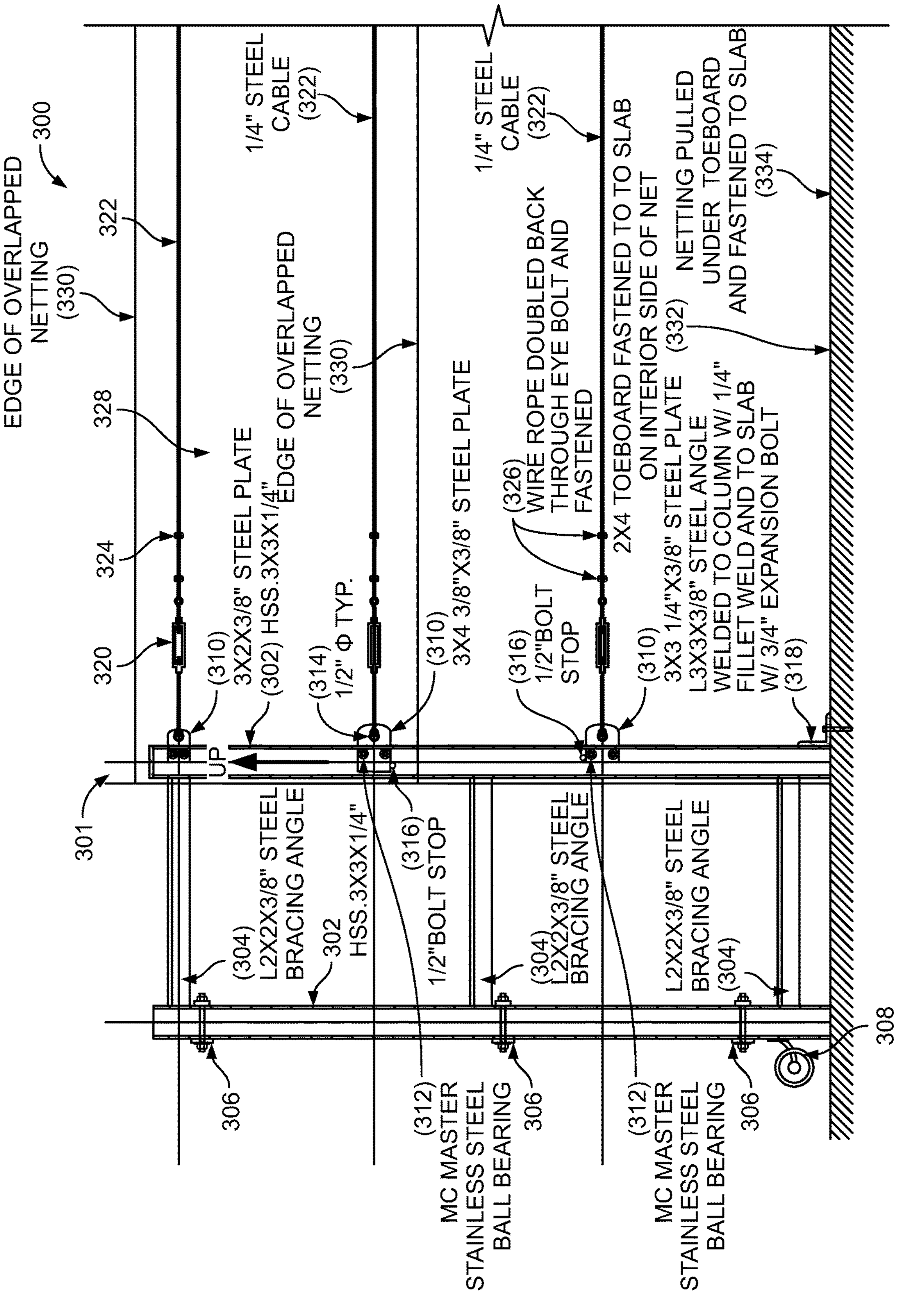
FIG. 11 is side view of another embodiment of the present disclosure, wherein a transportable frame assembly is provided.

FIG. 11 is side view of another embodiment of the present disclosure, indicated generally at 300 wherein a transportable frame assembly 301 is provided. Advantageously, the transportable frame assembly 301 can be easily transported to and positioned around a structural element such as a column of a building, and provides structural support for the system of the present disclosure while not requiring any attachment to the column of the building or any alteration thereof (e.g., no requirement to remove fireproofing or to affix any components to the column of the building). The frame 301 is formed from a plurality of vertical channels or tubes 302 which are positioned at corners of the frame 301 and are interconnected by a plurality of horizontal members 304 (e.g., steel bracing angles), which could be welded to the tubes 302 or otherwise affixed thereto (e.g., by fasteners, etc.). One or more plates 306 and associated threaded rods, nuts, and washers could also be provided. A plurality of wheels 308 are attached to ends of the channels/tubes 302, allowing the frame assembly 301 to be transported to a desired location. It is noted that the frame 301 could be a free-standing structure, in that it need not be affixed to or surround an existing structural component of a building.

Similar to the embodiment discussed above in connection with FIGS. 1-2, a plurality of adjustable cables 322 are also provided, and are movably affixed to the transportable frame 301. The cables 322 could be moved horizontally or vertically relative to the frame 301, and could be attached to movable plates 310 which travel within the channels/tubes 302 via ball bearings 312 or other rollers, wheels, etc., as discussed in connection with the other embodiments herein. Apertures 314 could be formed in the plates 310, and facilitate attachment of the cables 322 thereto. A plurality of bolt stops 316 could also be provided, to limit movement of the movable plates. The frame 301 could be attached to a floor slab via one or more floor anchors 318, which could be steel angles that are welded on one side to the frame 301 and attached on another side to the floor or slab via suitable bolts or anchors (e.g., expansion bolts). Turnbuckles 320 could also be provided, and allow for tensioning of the cables 322 as desired. Fasteners 324, 326 are provided for fastening the cables 322 to the turnbuckles 320. Netting 328 could be positioned about the cables 322 and overlapped at edges 330, in order to provide further protection against falls at the edge of a building. A toeboard 332 could also be provided for fastening the netting 328 against the slab of the building. As illustrated at 334, the netting 328 could be pulled under the toeboard 332 and fastened to the slab.

Figure 12:
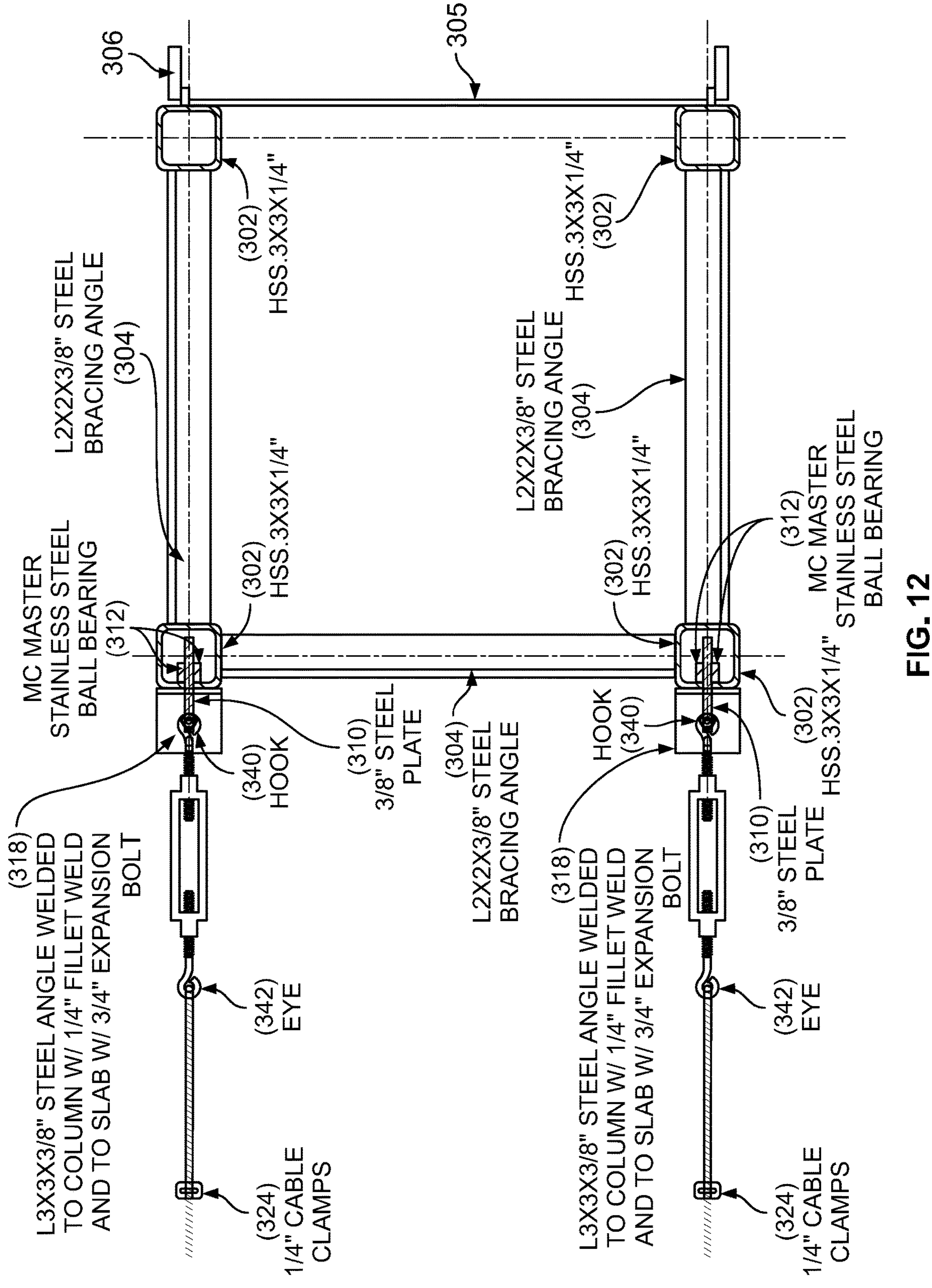
FIG. 12 is a top plan view of the frame assembly of FIG. 11.

FIG. 12 is a top plan view of the frame assembly 301 of FIG. 11. As can be seen, the cables 322 are vertically positionable along the lengths of two of the channels/tubes 302. Each of the turnbuckles 320 includes an eye 342 through which a corresponding one of the cables 322 is threaded, looped back against itself, and then fastened by the clamp 324, as well as a hook 340 which extends through an aperture in the plate 310.

Figure 13:
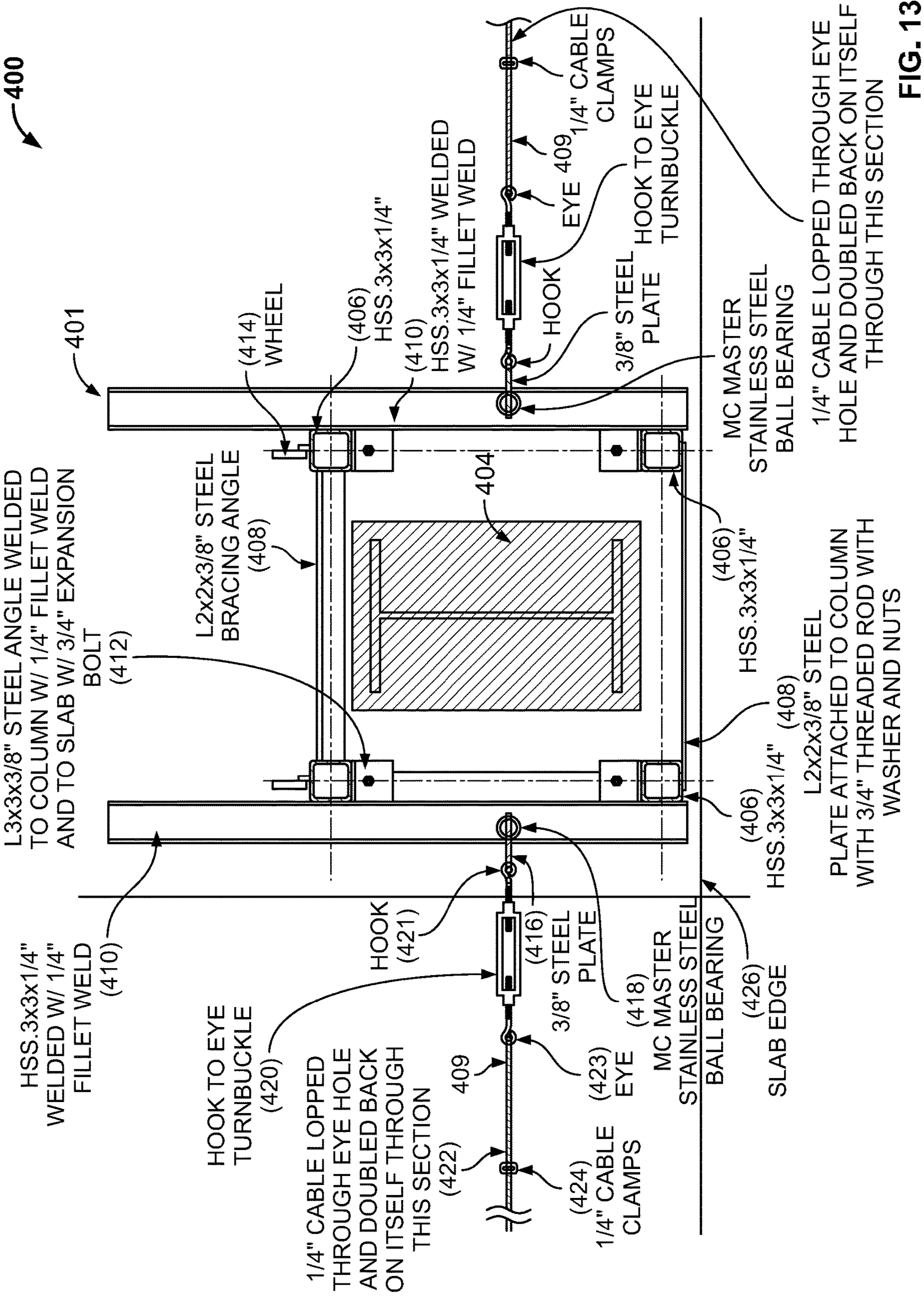
FIG. 13 is a top plan view of another embodiment of the transportable frame assembly of the present disclosure.

FIG. 13 is a top plan view of another embodiment of the transportable frame assembly of the present disclosure, indicated generally at 400. In this embodiment, a plurality of cables 422 are movable horizontally along horizontal tracks 410 that are affixed to the frame 401, and the frame 401 surrounds a structural element of a building, such as a column 404. The frame 401 is formed from vertical corner members 406 that are interconnected with horizontal connecting members 408 (which could be affixed to each other in any suitable fashion, e.g., by welding, fasteners, etc.). The frame 401 includes wheels 414 that allow the frame to transported to and positioned adjacent to the column 404. One end of the frame 401 (i.e., the end facing the slab edge 426) is open, so that the frame 401 can be positioned about the column 404. The frame 401 could be fastened to the floor slab via one or more anchors 412 (which could be steel bracing angles). After the frame 401 has been positioned in place around the column 401, a horizontal connecting member 408 could be attached between two of the vertical members 406 (e.g., using threaded rod and washers and nuts).

The cables 422 can travel horizontally with respect to the tracks 410 via plates 416 that slide along the tracks 410 via ball bearings 418. Turnbuckles 420 allow for selective tensioning of the cables 422, and include eyes 423 through which the cables 422 are inserted, looped back against each other, and clamped using cable clamps 424. The turnbuckles 420 also include hooks 421 which engage apertures formed in the plates 416. The tracks 410, plates 416, ball bearings 418, turnbuckles 420, hooks 421, eyes 423, cables 422, and associated clamps 424 are together referred to as movable cable assemblies 409.

Figure 14:
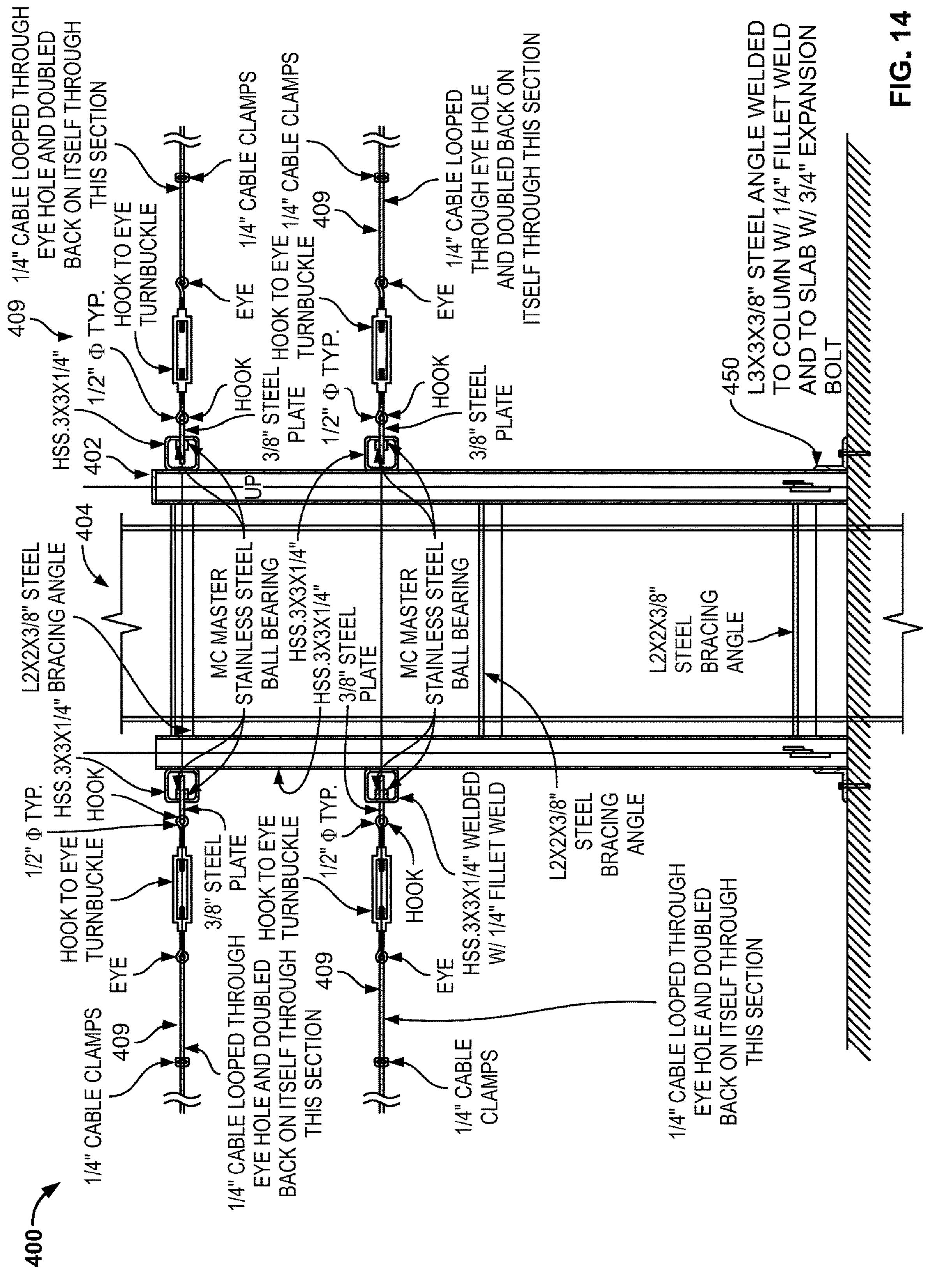
FIGS. 14-15 are side views of the transportable frame assembly of FIG. 13.
Figure 15:
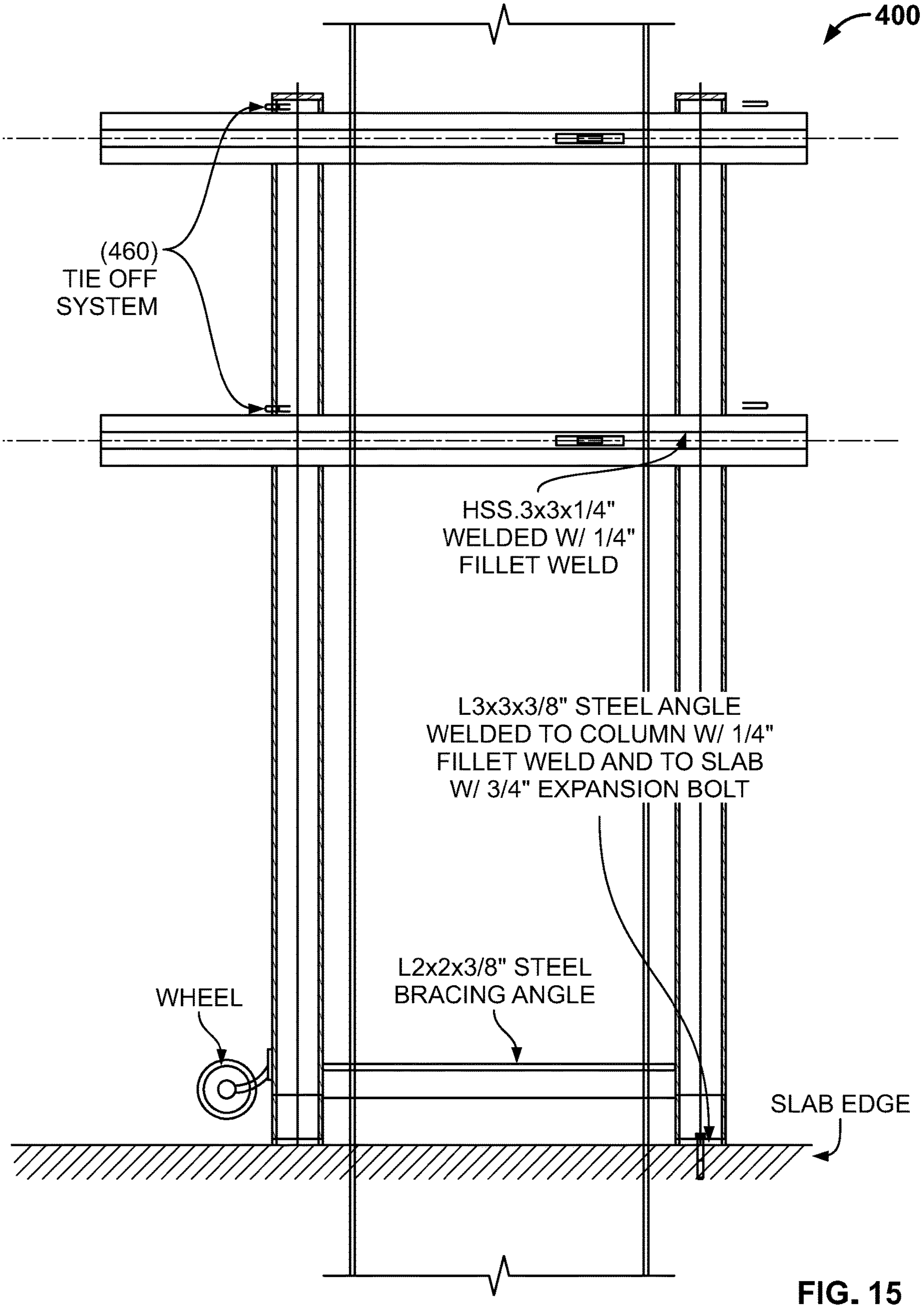

FIGS. 14-15 are side views of the transportable frame assembly of FIG. 13. As shown in FIG. 14, the movable cable assemblies 409 could be positioned on either side of the frame 401, and can be moved horizontally with respect to the frame 401. The frame 401 could additionally be anchored to the floor/slab of a structure using anchors 450, which could be welded on one side to the frame 401 and affixed to the floor/slab on another side of the anchor using expandable bolts or other fastening means. As shown in FIG. 15, the system 400 could also include a tie-off system 460, which could be formed by one or more eye hooks or other components fastened to the frame 401, and to which additional components could be tied, such as steel cables, etc.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure. What is desired to be protected by Letters Patent is set forth in the following claims.

What is claimed is:

1. A safety cable system, comprising:

a transportable frame comprising a plurality of vertical members and a plurality of horizontal members interconnecting the plurality of vertical members, the transportable frame positionable to surround a support column of a building; and a plurality of movable cable assemblies attached to the transportable frame, each of the plurality of movable cable assemblies movable with respect to the frame, wherein the plurality of vertical members of the transportable frame are positioned at corners of the transportable frame and extend upwardly from a floor or slab on which the transportable frame rests, at least two of the plurality of vertical members include wheels attached at bottom ends of the vertical members to transport the transportable frame, and at least another two of the vertical members include anchors attached at bottom ends of the vertical members to mount the frame to the floor or slab, and wherein each of the plurality of movable cable assemblies is movable along a track mounted horizontally between a pair of the plurality of vertical members.

2. The safety cable system of claim 1, wherein each of the plurality of movable cable assemblies comprises a plate movable within the track.

3. The safety cable system of claim 2, wherein the plate includes a wheel or roller to facilitate sliding of the plate with respect to the track.

4. The safety cable system of claim 2, wherein each of the plurality of movable cable assemblies comprises a turnbuckle for selectively tensioning a respective one of the plurality of movable cable assemblies, the turnbuckle attached at one end to the respective one of the plurality of movable cable assemblies and at an opposite end to a respective one of the plurality of movable plates.

* * * * *